US012338564B2

(12) United States Patent
Carpenter et al.

(10) Patent No.: US 12,338,564 B2
(45) Date of Patent: Jun. 24, 2025

(54) HOUSEHOLD APPLIANCE WITH LUMINARY COMMUNICATION INTERFACE

(71) Applicant: WHIRLPOOL CORPORATION, Benton Harbor, MI (US)

(72) Inventors: Scott E. Carpenter, Wanatah, IN (US); Marcus R. Fischer, Stevensville, MI (US); Joli A. Fytczyk, Kalamazoo, MI (US); Richard L. Hammond, Grand Haven, MI (US)

(73) Assignee: Whirlpool Corporation, Benton Harbor, MI (US)

(*) Notice: Subject to any disclaimer, the term of this patent is extended or adjusted under 35 U.S.C. 154(b) by 13 days.

(21) Appl. No.: 18/395,054

(22) Filed: Dec. 22, 2023

(65) Prior Publication Data

US 2024/0125029 A1 Apr. 18, 2024

Related U.S. Application Data

(63) Continuation of application No. 17/843,007, filed on Jun. 17, 2022, now Pat. No. 11,898,288, which is a (Continued)

(51) Int. Cl.

*D06F 33/00* (2020.01)
*D06F 34/22* (2020.01)
*G08B 5/36* (2006.01)

(52) U.S. Cl.

CPC .............. *D06F 33/00* (2013.01); *D06F 34/22* (2020.02); *G08B 5/36* (2013.01)

(58) Field of Classification Search

CPC . H04L 12/28; H04L 12/2823; H04L 12/2814; H04L 12/2816; H04L 12/282;

(Continued)

(56) References Cited

U.S. PATENT DOCUMENTS 3,600,602 A 8/1971 Yartz
4,977,394 A 12/1990 Manson et al.

(Continued)

FOREIGN PATENT DOCUMENTS

DE 4004057 C2 10/1997
DE 10144668 A1 3/2003

(Continued)

OTHER PUBLICATIONS

European Search Report for Counterpart EP20197620.6, Dated Jan. 21, 2021.

(Continued)

*Primary Examiner* — Van T Trieu
(74) *Attorney, Agent, or Firm* — McGarry Bair PC

(57) ABSTRACT

A household appliance for performing a cycle of operation according to a cycle of operation. The household appliance includes a cabinet defining a treating chamber, a tub located within the cabinet interior and defining a tub interior and having an access opening, a rotatable drum located within the tub interior, a user interface carried by the cabinet and coupled to a controller to provide data communication between the controller and a user, a pedestal for supporting the cabinet and comprising a liquid recirculation system for recirculating liquid to the treating chamber, at least one consumable received in a dock positioned in the pedestal for use in performing the cycle of operation, and, a luminary communication interface physically separated from the user interface and configured to emit at least one of colored light motion or light intensity patterns to illustrate a status of the at least one consumable.

17 Claims, 14 Drawing Sheets

Related U.S. Application Data continuation of application No. 17/128,641, filed on Dec. 21, 2020, now Pat. No. 11,384,465, which is a continuation of application No. 16/586,775, filed on Sep. 27, 2019, now Pat. No. 10,907,288.

(58) Field of Classification Search
CPC ..... H04L 12/2825; D06F 33/00; D06F 34/18; D06F 34/22; D06F 34/28; G05B 23/02; G05B 23/0272; G05B 23/0286
See application file for complete search history.

(56) References Cited

U.S. PATENT DOCUMENTS

| | | | |
|---|---|---|---|
| 6,024,867 | A | 2/2000 | Parise |
| 6,613,236 | B1 | 9/2003 | Guess et al. |
| 6,979,361 | B2 | 12/2005 | Mihayiov et al. |
| 8,337,693 | B2 | 12/2012 | Mitchell |
| 8,373,355 | B2 | 2/2013 | Hoover |
| 8,393,183 | B2 | 3/2013 | Benne et al. |
| 9,662,605 | B2 | 5/2017 | Mutha et al. |
| 9,915,020 | B2 | 3/2018 | Yang et al. |
| 9,936,848 | B2 | 4/2018 | Brain et al. |
| 10,907,288 | B1 | 2/2021 | Carpenter et al. |
| 2001/0010165 | A1 | 8/2001 | Kubota et al. |
| 2002/0116959 | A1 | 8/2002 | Ohta et al. |
| 2003/0229404 | A1 | 12/2003 | Howard et al. |
| 2008/0053162 | A1 | 3/2008 | Park et al. |
| 2012/0125366 | A1 | 5/2012 | Beshears, Jr. et al. |
| 2014/0259449 | A1 | 9/2014 | Alexander et al. |
| 2015/0169194 | A1 | 6/2015 | Ban et al. |
| 2016/0218884 | A1 | 7/2016 | Ebrom et al. |
| 2017/0357099 | A1 | 12/2017 | Last et al. |
| 2020/0240066 | A1* | 7/2020 | Ko .......................... D06F 34/32 |

FOREIGN PATENT DOCUMENTS

| | | | |
|---|---|---|---|
| DE | 102015104452 | A1 | 9/2016 |
| EP | 2140795 | A1 | 1/2010 |
| WO | 2010129476 | A2 | 11/2010 |

OTHER PUBLICATIONS

NPL_search.pdf (Aug. 16, 2021).
NPL Search (May 19, 2023).

* cited by examiner

HOUSEHOLD APPLIANCE WITH LUMINARY COMMUNICATION INTERFACE

CROSS REFERENCE TO RELATED APPLICATIONS

The present application is a continuation application of U.S. patent application Ser. No. 17/843,007, filed Jun. 17, 2022, now U.S. Pat. No. 11,898,288, which is a continuation application of U.S. patent application Ser. No. 17/128,641, filed Dec. 21, 2020, now U.S. Pat. No. 11,384,465, issued Jul. 12, 2022, which is continuation application of U.S. patent application Ser. No. 16/586,775, filed Sep. 27, 2019, now U.S. Pat. No. 10,907,288, issued Feb. 2, 2021, all of which are hereby incorporated by reference herein in their entirety.

BACKGROUND

Household appliances perform a variety of cycles of operation on various articles. In one form or another, most household appliances have a treating chamber holding an article that is treated according to a cycle of operation. Refrigerators/Freezers having a chamber in which an article, such as a food time, is placed for cooling/freezing according to a cycle of operation. Cooking appliances, such as ovens/microwaves have a treating chamber in which an article, such as a food item, is placed for heating, be it a cooking, broiling, baking, defrosting, warming proofing or other cycle of operation. Clothes washers/dryers have a treating chamber in which an article, such as laundry, is placed for a washing, refresh, de-wrinkle, drying or other cycle of operation, Dishwashers have a treating chamber in which a dish is placed for washing, sanitizing or other cycle of operation. These examples are merely illustrative.

In almost all cases, the household appliance can have a controller that implements a number of user-selectable, pre-programmed cycles of operation having one or more operating parameters. The user can select the desired cycle of operation.

The household appliance is normally operably coupled to one or more resources that can be used or consumed during the execution of the cycle of operation. Such resources include: hot water, cold water, or electricity. In some cases, the resources can include: consumables that are replaceable by the user. Such consumables include treating chemistries, such as detergents, fabric softeners, stain removers, bleach, to name a few. Other consumables can include: water softeners or water filters, to name a few more. These consumables can be configured in the form of a module, such as a container or cartridge, that can easily be inserted/removed from the household appliance.

BRIEF SUMMARY

The present disclosure relates to a method of providing a status of at least one consumable in a household appliance comprising a cabinet defining a treating chamber, a dock positioned in the cabinet, a controller programmed with a cycle of operation, and a user interface carried by the cabinet and physically spaced apart from the dock and coupled to the controller for providing data communication between the controller and user, the method comprising emitting at least one of a colored light pattern, a light motion pattern, or a light intensity pattern from a luminary communication interface to illustrate the status of the at least one consumable, and wherein a door overlies at least a portion of the dock and the luminary communication interface, or the luminary communication interface circumscribes at least a portion of the dock, or the luminary communication interface circumscribes the at least one consumable, or a second port is located in the cabinet and spaced from the dock and spaced from the user interface

DETAILED DESCRIPTION

Figure 1:
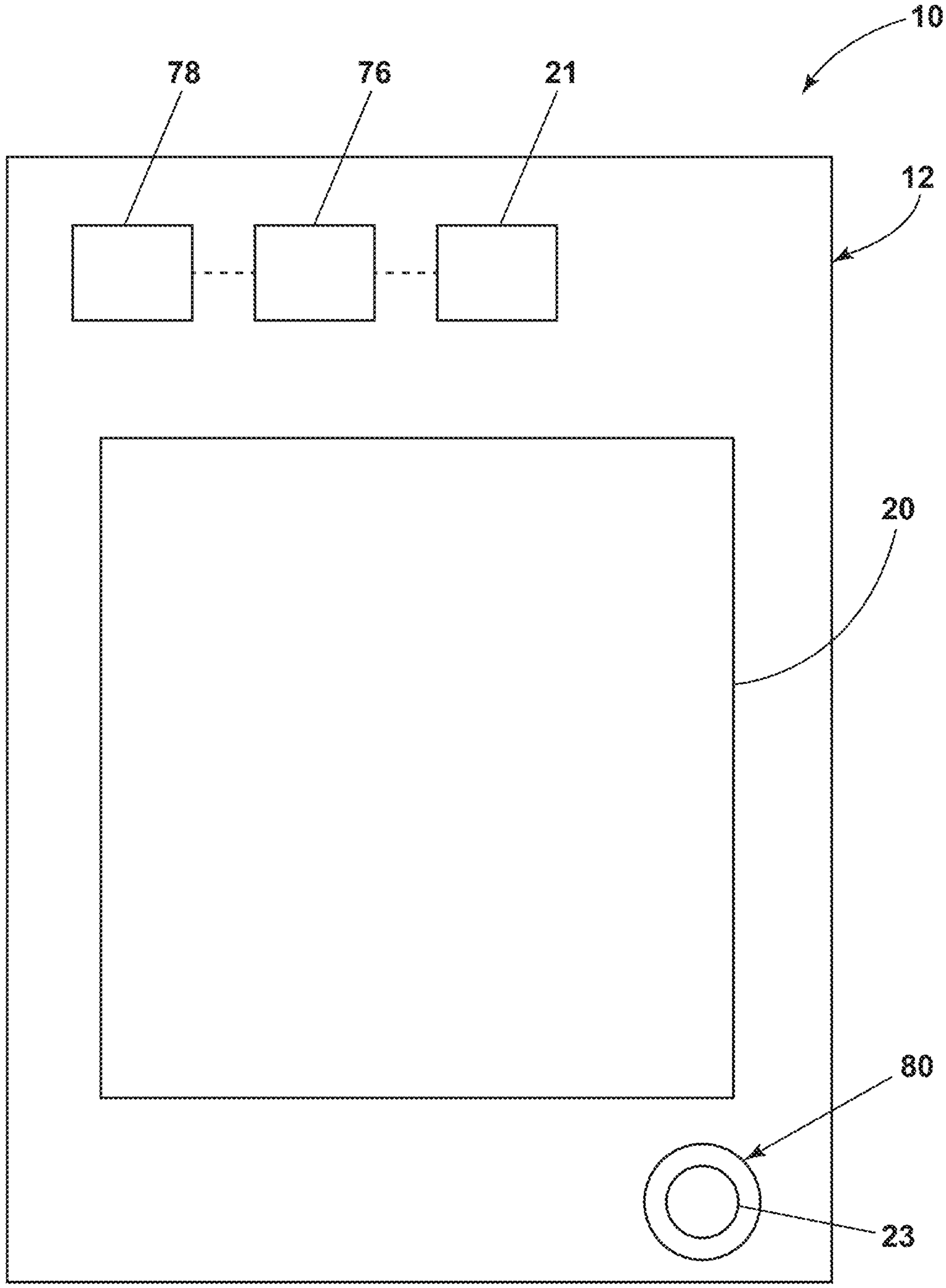
FIG. 1 is a schematic illustration of a household appliance including a cabinet and at least one consumable with a corresponding luminary communication interface.

FIG. 1 illustrates a schematic view of a household appliance 10 according to aspects of the present disclosure. The household appliance 10 can be any suitable household appliance, including, but not limited to a dishwasher, a refrigerator, a freezer, a range, a stove, an oven, a food recycler, a microwave, a cooktop, a laundry treating appliance, a clothes washing machine, a clothes dryer, a combination washing machine and dryer, a dispensing dryer, a tumbling or stationary refreshing/revitalizing machine, an extractor, a non-aqueous washing apparatus, a clothes refresher, a revitalizing machine, etc. All of these examples of household appliances can receive one or more article(s) for performing a cycle of operation on the one or more article(s) according to a cycle of operation. Non-limiting examples of elements can include, but are not limited to clothing items or food.

Further, the household appliance 10, upon receiving an article, can perform a cycle of operation. The cycle of operation can include, but is not limited to, freezing, cooling, cooking, baking, clothes washing, clothes drying, clothes treating, recycling food, dish drying, or dish washing.

The household appliance includes a cabinet 12 which defines a treating chamber 20. At least one controllable component 21 can be used in performing the cycle of operation. A controller 76 can be programmed with the cycle of operation and operably coupled to the at least one controllable component 21. A user interface 78 carried by the cabinet 12 and coupled to the controller 76 can provide data communication between the controller 76 and a user. At least one consumable 23 for use in performing the cycle of operation can be coupled to or housed by the cabinet 12. A luminary communication interface 80 is located on the cabinet 12 physically spaced from the user interface 78 and physically associated with the at least one consumable 23. The luminary communication interface 80 can emit at least one of colored light motion or light intensity patterns to illustrate the status of the at least one consumable 23

The luminary communication interface 80 physically associated with the at least one consumable 23 is illustrated, by way on non-limiting example, in a lower right portion of the cabinet 12. It is contemplated that the luminary communication interface 80 physically associated with the at least one consumable 23 can be located in or coupled to any portion of the cabinet 12. It is further contemplated that the user interface 78 can be at any location such that the user interface 78 is physically spaced from the luminary communication interface 80.

Figure 2:
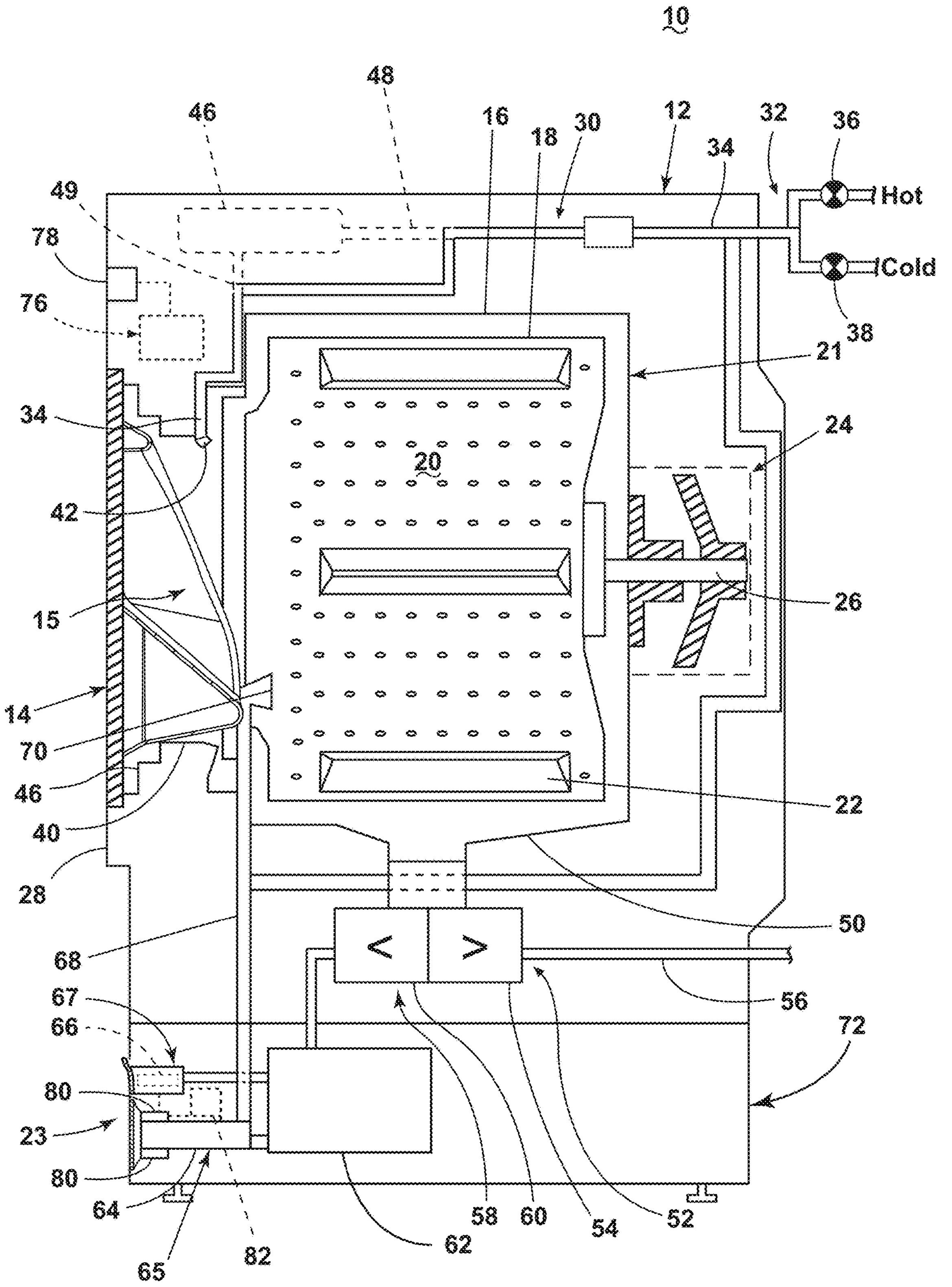
FIG. 2 is a schematic cross-sectional view of the household appliance of FIG. 1 illustrated, by way of example, as a laundry treating appliance.

Turning to FIG. 2, the household appliance 10 is illustrated herein, by way of non-limiting example, as a horizontal axis laundry treating appliance. The household appliance 10 shares many features of a conventional automated clothes washer and/or dryer, which will not be described in detail herein except as necessary for a complete understanding of the exemplary aspects in accordance with the present disclosure.

The household appliance 10 includes the cabinet 12, which can be a housing having a chassis and/or a frame, defining an interior enclosing components typically found in conventional household appliances, such as, but not limited to, motors, pumps, fluid lines, controls, sensors, transducers, and the like. Such components will not be described further herein except as necessary for a complete understanding of the invention.

A door 14 can be mounted to or carried by the cabinet 12 to selectively close an access opening to the interior of a liquid-holding, imperforate tub 16. The tub 16 can be supported within the cabinet 12 by a suitable suspension system (not shown). A drum 18 can be provided within the tub 16 and may have an inner periphery at least partially defining the treating chamber 20 with an open face for receiving the article, such as a laundry item, to be treated according to a cycle of operation. That is, the drum 18 can be one non-limiting example of at least one controllable component 21 for use in performing the cycle of operation. The drum 18 can be mounted for rotation within the tub 16 and can have perforations that permit the flow of liquid between the drum 18 and the tub 16.

The tub 16 and drum 18 may have aligned openings, which provide access to the treating chamber 20. The door 14 can be provided to selectively close at least one of the aligned openings to selectively provide access to the treating chamber 20 through the open face of the treating chamber 20. While the illustrated laundry treating appliance includes both the tub 16 and the drum 18, with the drum 18 defining the treating chamber 20, it is within the scope of the disclosure that the household appliance or household appliance 10 can include only one receptacle for an article, with the receptacle being the treating chamber 20 defined by the cabinet 12.

At least one lifter 22 can be provided in the drum 18 to facilitate movement of the laundry load within the drum 18 as the drum 18 rotates. The lifter 22 can be provided on the inner periphery of the drum 18. Multiple lifters 22 can be provided and can optionally be evenly spaced about the inner periphery of the drum 18.

The drum 18 may be coupled with a motor 24 through a drive shaft 26 for selective rotation of the drum 18 during a cycle of operation. It is also within the scope of the disclosure for the motor 24 to be coupled with the drive shaft 26 through a drive belt for selective rotation of the drum 18. The motor 24 can rotate the drum 18 at multiple or variable speeds and in one direction or opposite rotational directions.

A liquid supply system 30 can be included in the household appliance 10 to supply liquid to the treating chamber 20. More specifically, liquid, such as water, can be supplied from a liquid source 32, such as a household water supply, to the household appliance 10 by operation of at least one control valve controlling the flow of water through a supply or inlet conduit 34. As shown herein, separate valves 36, 38 can control the supply of hot and cold water, respectively, through the inlet conduit 34. The inlet conduit 34 can direct the water from the liquid source 32 to the treating chamber 20, and as an example, the inlet conduit 34 may direct the water into the drum 18. As shown, the inlet conduit 34 can be coupled with a bellows 40.

The inlet conduit 34 can include a liquid dispenser in the form of a supply nozzle 42, for example, configured to supply the water into the treating chamber 20 along a flow path in a desired pattern and under a predetermined amount of pressure. For example, the supply nozzle 42 can be configured to supply a stream of water into the treating chamber 20 by gravity, i.e., a non-pressurized stream. The supply nozzle 44 can be mounted to the bellows 40 and be located in any desired position around the open face of the treating chamber 20.

A chemistry dispenser 46 can be included in the liquid supply system 30. It is contemplated that a valve 48 can selectively direct fluid from the inlet conduit 34 to the chemistry dispenser 46. It is further contemplated that a valve 49 selectively fluidly couple the chemistry dispenser 46 to the liquid supply system 30 upstream of the supply nozzle 44 for providing liquid or treating chemistries to the treating chamber 20.

Liquid in the treating chamber 20 can flow by gravity to a low portion or sump 50 of the tub 16. A liquid drain system 52 can be provided for draining liquid from the treating chamber 20. The liquid drain system 52 can include a drain pump 54 and a drain conduit 56. The drain pump 54 fluidly couples the sump 50 to the drain conduit 56 such that liquid in the tub 16 can be drained via the drain conduit 56. The drain conduit 56 can be coupled with a household drain.

A liquid recirculation system 58 can be provided for recirculating liquid to the treating chamber 20 during a cycle of operation. As illustrated, the recirculation system 58 includes a recirculation pump 60, a recirculation tank 62, and the at least one consumable 23 for use in the performing the cycle of operation. The at least one consumable 23 can be, but is not limited to a filter cartridge, softener cartridge, or fluid treatment cartridge. Non-limiting examples of filter cartridges can include water or other liquid filters, vacuum bags, or air filters. Non-limiting examples of softener cartridges can include cartridges for water softening. Non-limiting examples of fluid treating cartridges includes cartridges containing detergent, bleach, stain treatment, scents, pods, or user defined homemade cartridges. Bulk cartridges of any of the aforementioned are also considered. By way of non-limiting example, the at least one consumable 23 is illustrated as multiple consumables; a water filter cartridge 64 and a water softener cartridge 66. The filter cartridge 64 can be received in a first internal dock 65 in the cabinet 12. A second internal dock 67 in the cabinet 12 can receive the softener cartridge 66.

The recirculation pump 60 or the drain pump 54 fluidly couples the tub 16 to the recirculation tank 62. Alternatively, the sump 50 can fluidly couple to the recirculation tank 62, using gravity to move liquid from the sump 50 to the recirculation tank 62.

Water treating chemistries can be supplied to the recirculation tank 62 from the softener cartridge 66. The recirculation pump 60 or the drain pump 54 can then pump at least a portion of the treated liquid in the recirculation tank 62 to the filter cartridge 64. The filter cartridge 64 is fluidly connived to a spray conduit 68. The spray conduit 68 can fluidly couple with the inlet conduit 34 or another sprayer 70 for fluid communication with the treating chamber 20. While illustrated as including the filter cartridge 64 and the softener cartridge 66, it is contemplated that a variety of consumable or non-consumable additives or structures. For example, the recirculation system 58 couple include additional conduit, valves, or the chemistry dispenser 46, while recirculating liquid from the treating chamber 20 to the recirculation tank 62 and back to the treating chamber 20. It is further contemplated that the liquid recirculation system 58 can use only consumable or non-consumable additives or structures, that is no recirculation tank 62, to recirculate liquid from the treating chamber 20 for treatment and redistribution to the treating chamber 20 during a portion of the cycle of operation.

While the household appliance 10 is illustrated as having separate drain and recirculation pumps 54, 60, it is contemplated that, the household appliance 10 can include a single pump configured to selectively drain or recirculate liquid, such as by configuring the pump to rotate in opposite directions, or by providing a suitable valve system.

It is contemplated that at least one component of the liquid recirculation system 58 can be located in a lower portion or pedestal 72 of the cabinet 12.

The household appliance 10 can further include one or more devices for heating the liquid, such as a steam generator and/or a sump heater (not shown). The steam generator may be provided to supply steam to the treating chamber 20. The sump heater may be used to heat liquid in the sump 50. Alternatively, the sump heater may be used to heat laundry (not shown), air, the drum 18, or liquid in the tub 16 to generate steam, in place of or in addition to the steam generator. The steam generator may be used to heat the laundry as part of a cycle of operation, much in the same manner as a sump heater, as well as to introduce steam to treat the laundry.

A controller 76 can be located within the cabinet 12 for controlling the operation of the household appliance 10 to implement one or more cycles of operation, which can be stored in a memory of the controller 76. Examples, without limitation, of cycles of operation that can be programmed onto the controller 76 include: wash, heavy duty wash, delicate wash, quick wash, refresh, rinse only, and timed wash. A user interface 78 can be carried by the cabinet 12 and coupled to the controller 76. The user interface 78 can provide data communication between the controller 76 and a user. The user interface 78 can include one or more knobs, switches, touch displays, display screens, and the like for communicating with the user, such as to receive input and provide output.

The user can enter many different types of information, including, without limitation, cycle selection and cycle parameters, such as cycle options. During operation of household appliance 10, the controller 76 can be operably coupled with one or more components of the household appliance 10 for communicating with and controlling the operation of the component to complete a cycle of operation. For example, the controller 76 can be operably coupled with at least the motor 24, the valves 36, 38, 48, 49, the chemistry dispenser 46, the drain pump 54, and the recirculation pump 60 to control the operation of these and other components to implement one or more of the cycles of operation.

A luminary communication interface 80 located on the cabinet 12 is physically spaced from the user interface 78. The luminary communication interface 80 is physically associated with at least one of the at least one consumable 23, illustrated by way of non-limiting example as adjacent the filter cartridge 64. That is, the luminary communication interface 80 is physically associated with the filter cartridge 64 by circumscribing the first internal port 65, where the first internal port 65 is designed to receive the filter cartridge 64.

The luminary communication interface 80 can emit at least one of colored light motion or light intensity patterns to illustrate the status of the at least one consumable 23 or filter cartridge 64. The luminary communication interface 80 can be in communication with the filter cartridge 64 or the softener cartridge 66. It is contemplated that the luminary communication interface 80 can be connected to a supplemental controller 82, wherein the supplemental controller 82 can be in communication with or determine a status of the at least one consumable 23. That is, the status of the filter cartridge 64 or the softener cartridge 66, or both, can be determined by the supplemental controller 82. The status can then be communicated to the user via the luminary communication interface 80. The supplemental controller 82 can include or be coupled to a variety of sensors. It is contemplated that the supplemental controller 82 can be in communication with the controller 76. It is further contemplated that the supplemental controller 82 operates independently or does not require communication with the controller 76. However, it is possible for the supplemental controller 82 to be in communication with the controller 76. It is even possible for the controller 76 to perform the control function of the supplemental controller 82.

Figure 3:
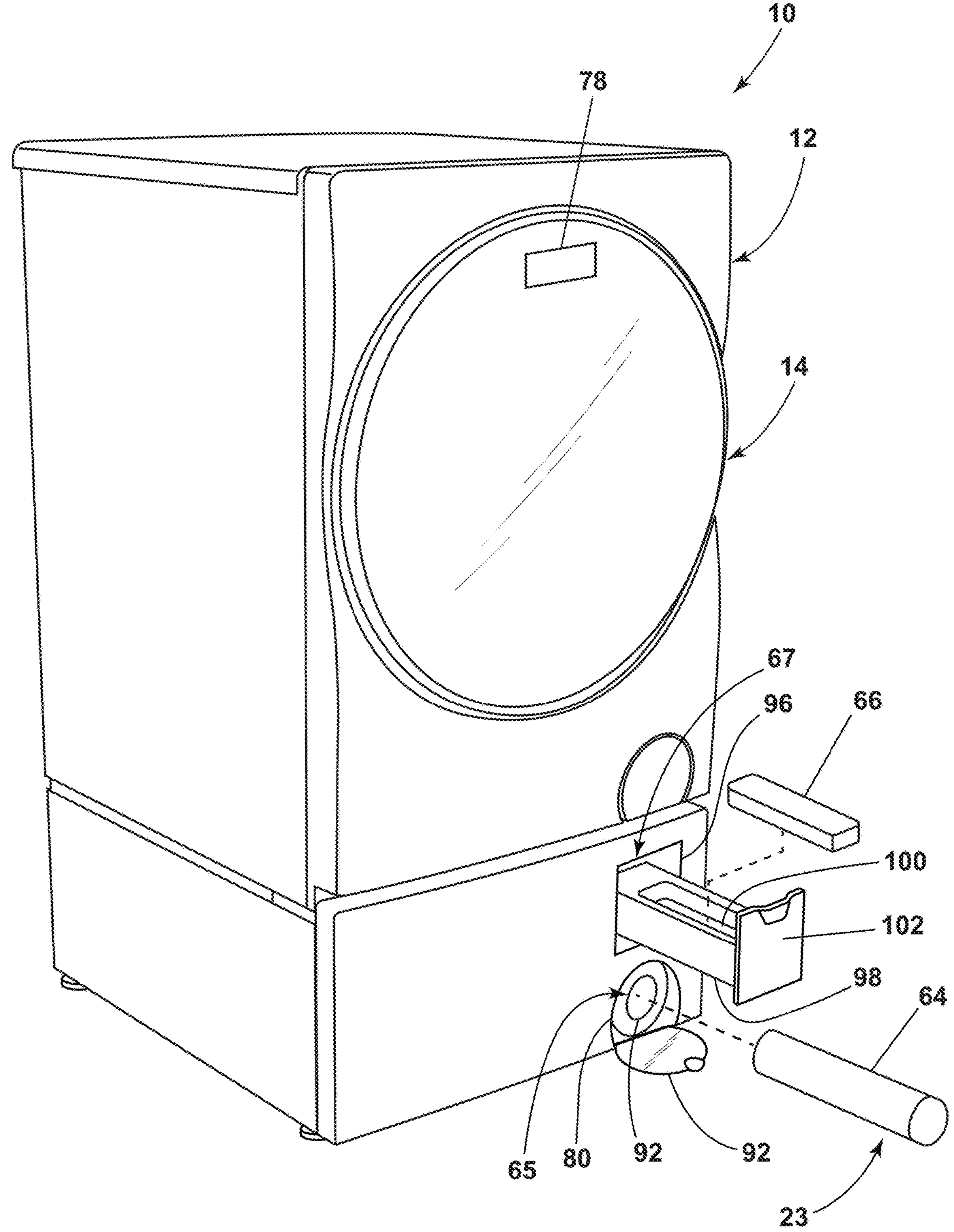
FIG. 3 is a partially exploded schematic perspective view of the household appliance of FIG. 2.

FIG. 3 is schematic perspective view of the household appliance 10 where the at least one consumable 23 is illustrated as exploded from the household appliance 10. The at least one consumable 23 includes multiple consumables illustrated, by way of non-limiting example, as the filter cartridge 64 and the softener cartridge 66.

The filter cartridge 64 is illustrated as removed from the first internal dock 65. The first internal dock 65 can include a first port 90 in the cabinet 12 through which the filter cartridge 64 can be received or removed from the first internal dock 65. It is contemplated that the luminary communication interface 80 circumscribes the first port 90. It is further contemplated that the luminary communication interface 80 defines the first port 90.

A first door 92, illustrated in an open position, can be provided to selectively close or otherwise overlie the first port 90, the luminary communication interface 80, or both the first port 90 and the luminary communication interface 80. The first door 92 can be transparent, semi-transparent, or otherwise non-opaque cover. The transparent, semi-transparent, or otherwise non-opaque first door 92 allows the user to view the luminary communication interface 80 when the first door 92 is in the closed position. The first door 92 can diffuse the luminary communication interface 80.

The luminary communication interface 80 can include a light source, such as, but not limited to an array of LED's that can be controlled, such as by the supplemental controller 82, to provide at least one of colored light motion or light intensity patterns to illustrate the status of at least one of the at least one consumable 23 or filter cartridge 64. The luminary communication interface 80 can emit unique combinations of colored light motion and light intensity patterns for each of the multiple consumables to uniquely illustrate the status of each of the multiple consumables. By way of non-limiting example, the luminary communication interface 80 can provide information about the status of the filter cartridge 64 using a first color and information about the status of the softener cartridge 66 using a second color.

A second port 96 in the cabinet 12 can allow access to the second internal dock 67. The second internal dock 67 can include a drawer 98 which slides in and out of the second internal dock 67 via the second port 96. A consumable receiving portion 100 can be defined by the drawer 98. The consumable receiving portion 100 can receive or otherwise couple to at least a portion of the softener cartridge 66. A second door 102 can be coupled to the drawer 98 and slidably received by the cabinet 12. The second door 102 is illustrated as opaque. However, it is contemplated that the second door can be transparent, semi-transparent, or otherwise non-opaque cover. It is further contemplated that at least a portion of the second door 102 is generally the same color as the second color used by the luminary communication interface 80 to indicate the status of the softener cartridge 66.

While illustrated as located in the pedestal 72 of the cabinet 12, it is contemplated that the first and second doors 92, 102 for the first and second internal docks 65, 67 and the corresponding the luminary communication interface 80 can at any location in the cabinet 12.

The user interface 78, by way of non-limiting example, is illustrated in the door 14 carried by the cabinet 12. Similarly, it is contemplated that the user interface 78 can also be located at any location carried by the cabinet 12 that is separate from the luminary communication interface 80.

Figure 4:
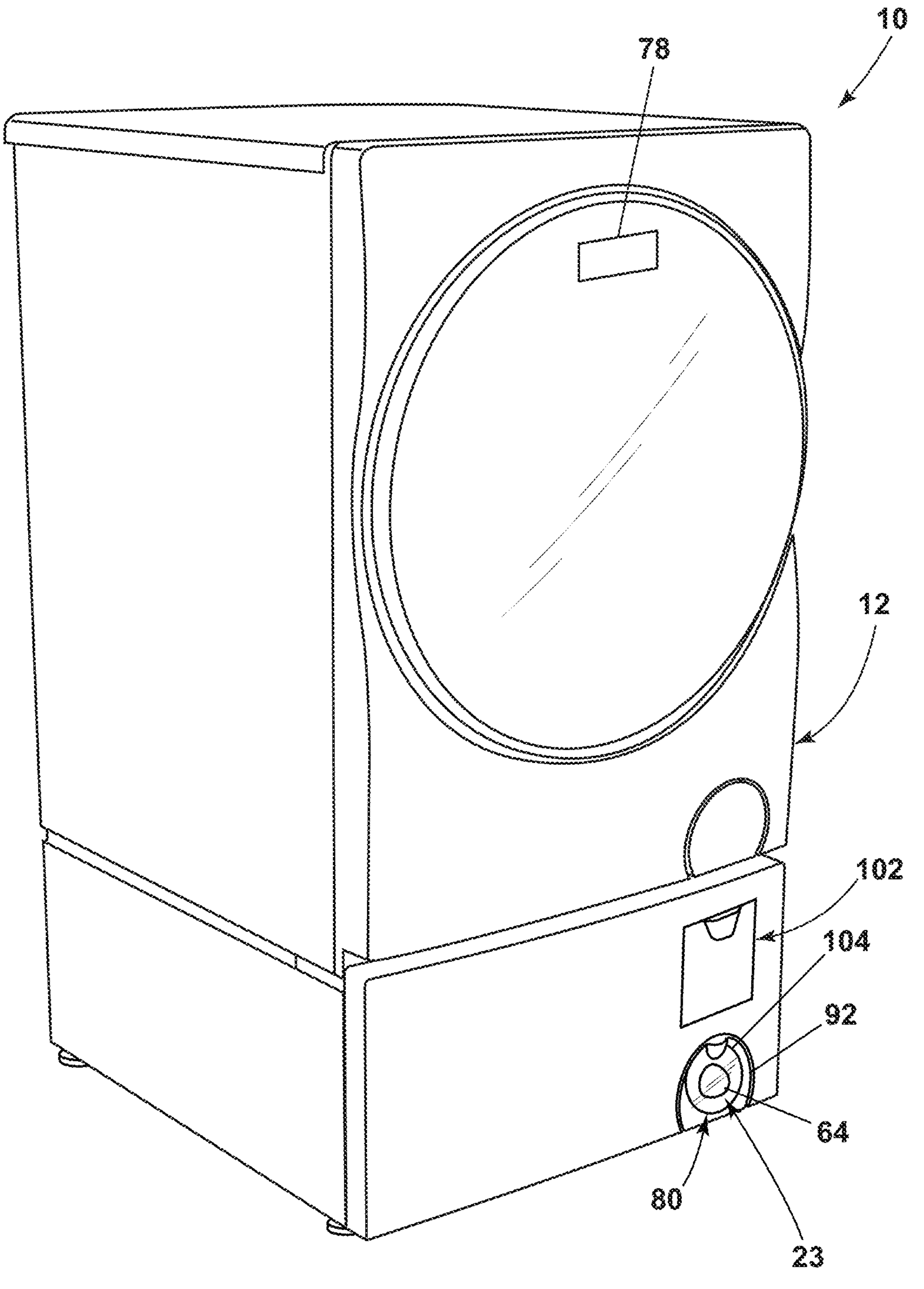
FIG. 4 is a schematic perspective view of the household appliance of FIG. 2.

FIG. 4 illustrates the household appliance 10 wherein the household appliance 10 is performing a cycle of operation and the luminary communication interface 80 is activated.

A light emitting portion 104 of the luminary communication interface 80 allows the luminary communication interface 80 to communicate with the user. The light emitting portion 104 can be in the shape of an annulus, that is, the light emitting portion 104 can be a ring-shaped region that is bounded by two concentric circles. While illustrated as an annulus, it is contemplated that the light emitting portion 104 can be any shape such as rectangular, triangular, circular, or irregular. The light emitting portion 104 can have a surface area greater than the user interface 78. It is contemplated that the area of the light emitting portion is at least 2% or more of the total surface area of a front panel 106 of the cabinet 12 of the household appliance 10.

At least one light source illuminates the light emitting portion 104. The light emitting portion 104 of the luminary communication interface 80 can emit the unique combinations of colored light motion and light intensity patterns. The light motion and light intensity patterns can indicate a status of the cycle of operation or indicate the status of the at least one consumable 23.

The light motion and light intensity patterns displayed by the light emitting portion 104 can be controlled by the supplemental controller 82 or the controller 76. The light motion and light intensity patterns can include, but are not limited to, a ring pulse, a semi-circle rocker, a quarter twist, a 360 sweep, a split ring, an upward sweep, and a double sweep.

Figure 5B:
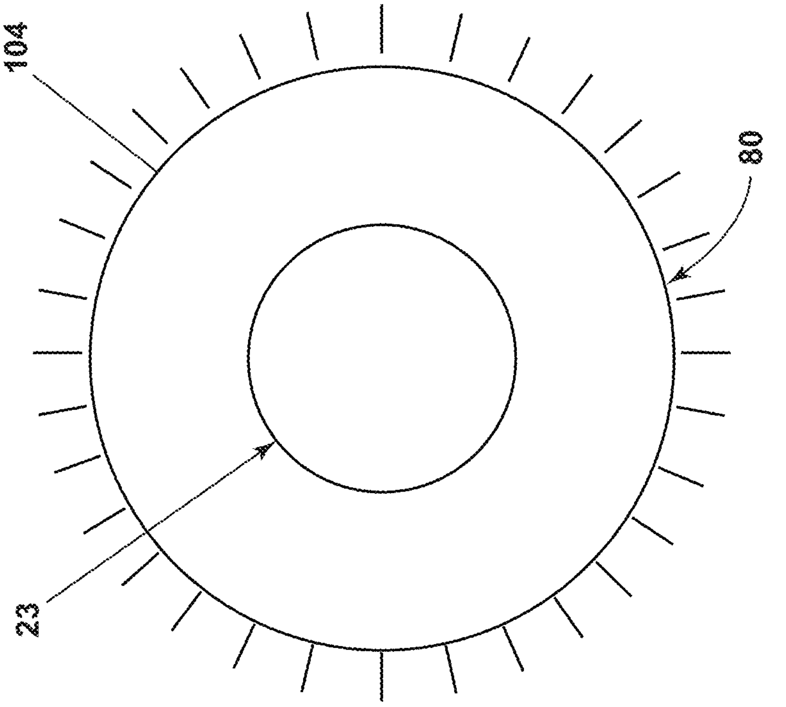
FIGS. 5A-B are a schematic illustration of a ring pulse illumination pattern of the household appliance of FIG. 2.
Figure 5A:
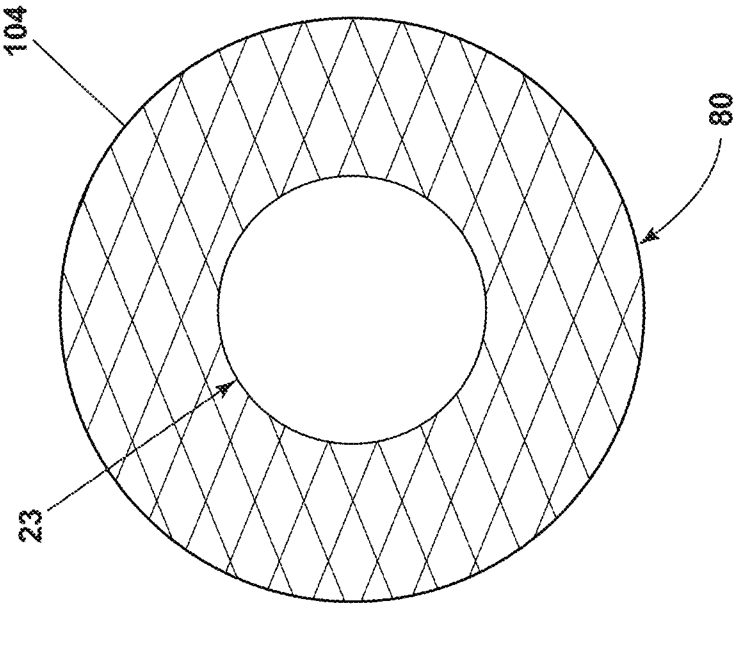

FIGS. 5A-B illustrate the ring pulse illumination pattern. The ring pulse begins at 5A with the light emitting portion 104 completely unlit. The cross hatching or checkered pattern illustrates unlit portions of the light emitting portion 104. Next, the entire light emitting portion 104 is dimly lit and appears as a solid ring (or annulus). The intensity increases until the solid ring or annulus reaches a predetermined intensity, as illustrated in FIG. 5B. Then the intensity of the solid ring or annulus decreases until the light emitting portion 104 appears generally unlit as in FIG. 5A. The repeat of this effect provides a pulsing effect to the solid ring or annulus.

Figure 6B:
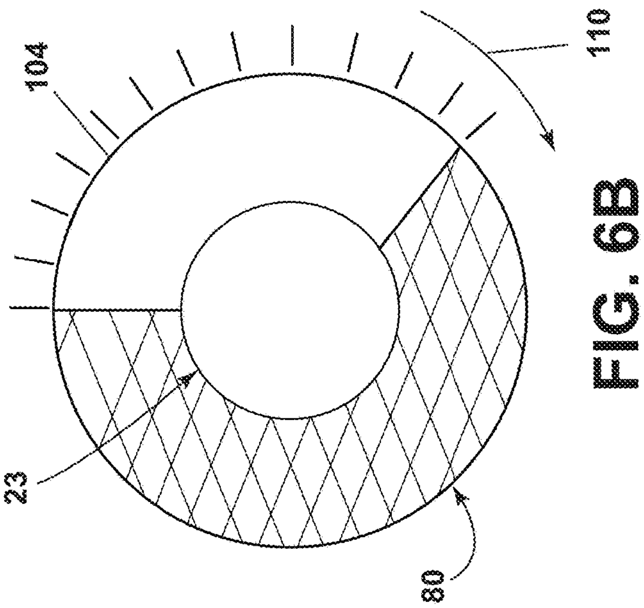
FIGS. 6A-C are a schematic illustration of a 360 sweep illumination pattern of the household appliance of FIG. 2.
Figure 6C:
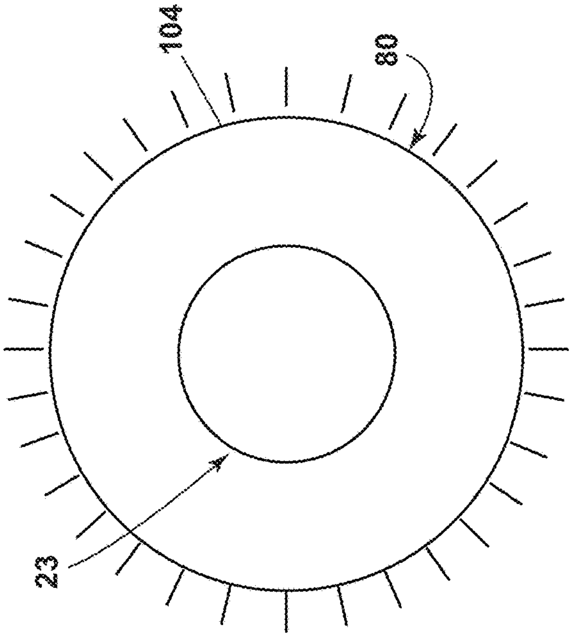
Figure 6A:
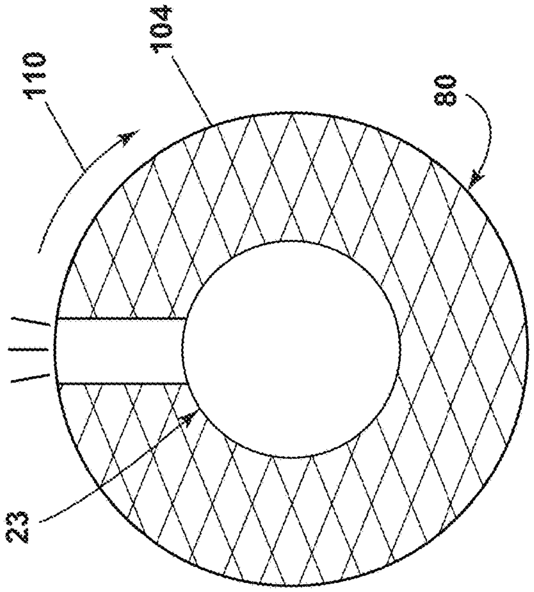

FIGS. 6A-C illustrate the 360 sweep illumination pattern. The 360 sweep begins with a small top portion of the light emitting portion 104 lit as illustrated in FIG. 6A. The percentage of the light emitting portion 104 that is lit then increases in a clockwise direction, as indicated by an arrow 110 and illustrated between FIG. 6A and FIG. 6B. The lit portion of the light emitting portion 104 continues to increase until the entire light emitting portion 104 is lit as illustrated in FIG. 6C.

Figure 7C:
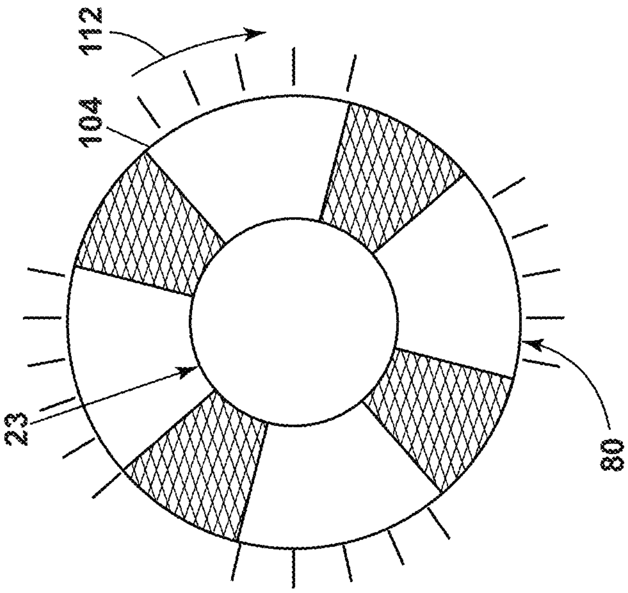
FIGS. 7A-E are a schematic illustration of a quarter twist illumination pattern of the household appliance of FIG. 2.
Figure 7B:
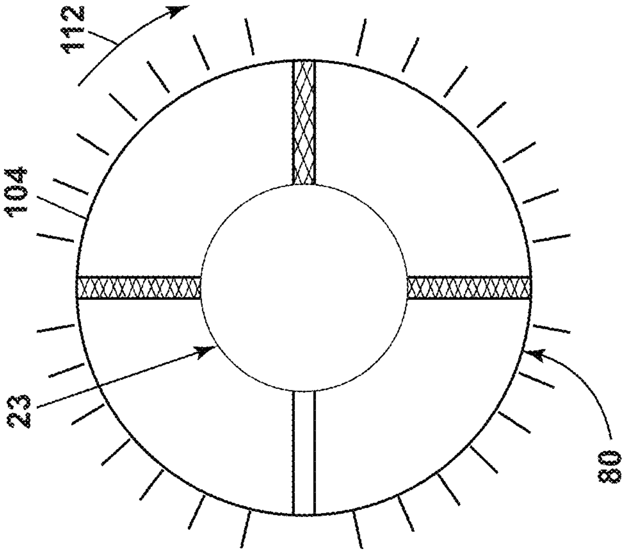
Figure 7A:
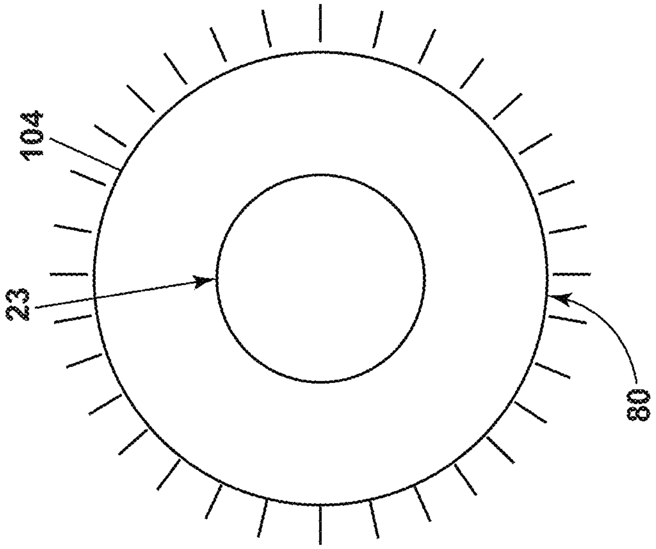
Figure 7E:
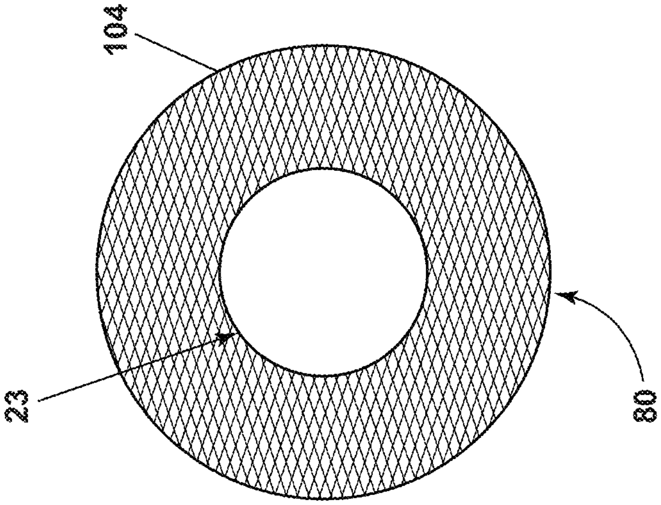
Figure 7D:
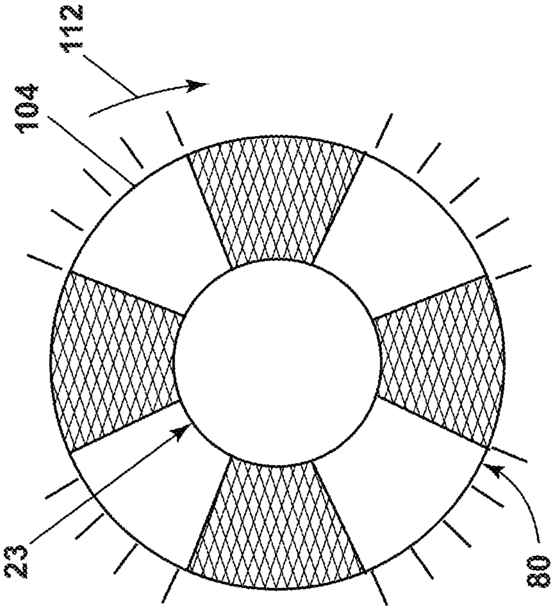

FIGS. 7A-E illustrate the quarter twist illumination pattern. The quarter twist begins with the entirety of the light emitting portion 104 of the luminary communication interface 80 lit, as shown in FIG. 7A. The continuity of the annulus shape generated by lighting the entire light emitting portion 104 is broken up when 4 small areas of the light emitting portion 104 cease to be illuminated as shown in FIG. 7B. The four equally spaced and equally sized non-illuminated areas grow in a clockwise direction, indicated by an arrow 112. Similarly, the four equally spaced and equally sized illuminated portions also grow in the clockwise direction but at a rate less than the non-illuminated portions. The rotation and decrease of the lit portions of the light emitting portion 104 are illustrated by FIG. 7B to FIG. 7C and FIG. 7C to FIG. 7D. This continues until the entire light emitting portion 104 is no longer lit, as shown in FIG. 7E. The result is the appearance of the solidly lit ring being split into four equal pieces where the four equally spaced and equally sized illuminated portions appear to shrink in size as they spin or rotate in a clockwise direction. While illustrated as distinct, it is contemplated that the change in size is gradual and that the figures are only representative figures to understand the general progression of the pattern.

Figure 8C:
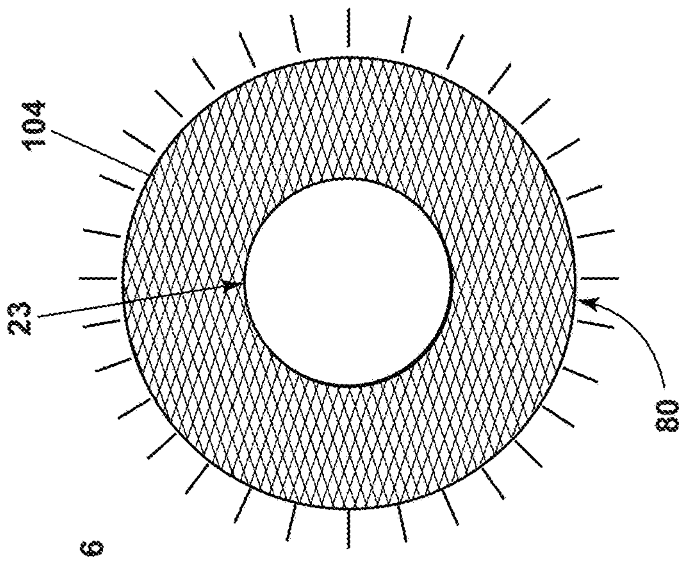
FIGS. 8A-C are a schematic illustration of a double sweep illumination pattern of the household appliance of FIG. 2.
Figure 8B:
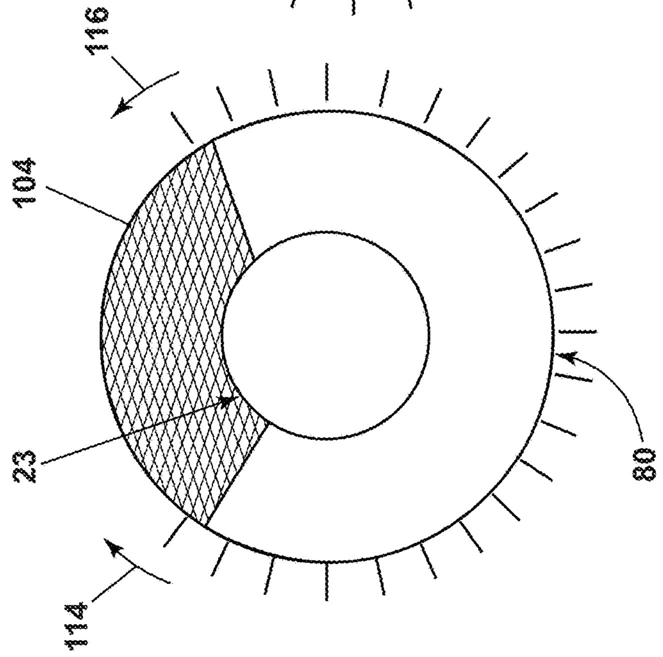
Figure 8A:
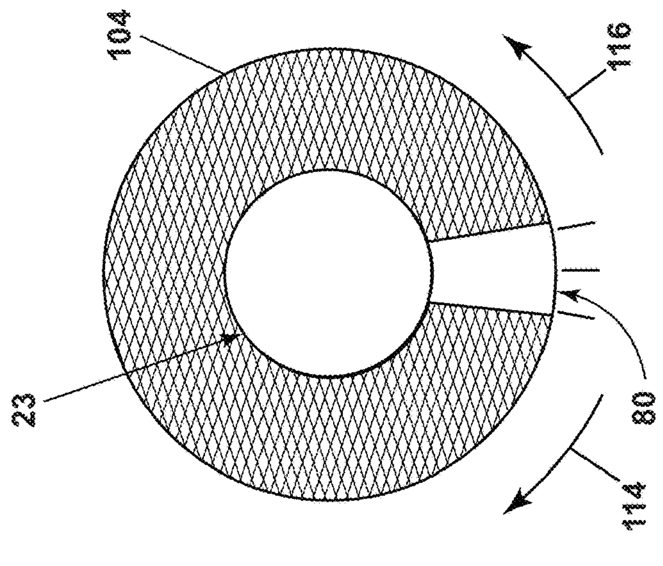

FIGS. 8A-C illustrate the double sweep illumination pattern. The double sweep begins with a small part of the bottom of the light emitting portion 104 lit as illustrated in FIG. 8A. FIG. 8B illustrates how the lit portion grows in the clockwise and counterclockwise directions, indicated by arrows 114, 116 until the entire light emitting portion 104 is lit, as shown in FIG. 8C. The pattern then abruptly repeats, going from completely lit to only the small part on the bottom lit, as illustrated in FIG. 8A.

Figure 9C:
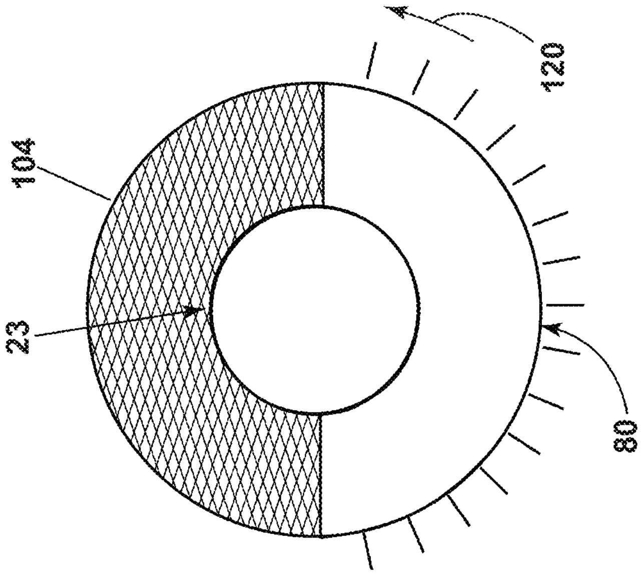
FIGS. 9A-E are a schematic illustration of a semi-circle rocker illumination pattern of the household appliance of FIG. 2.
Figure 9B:
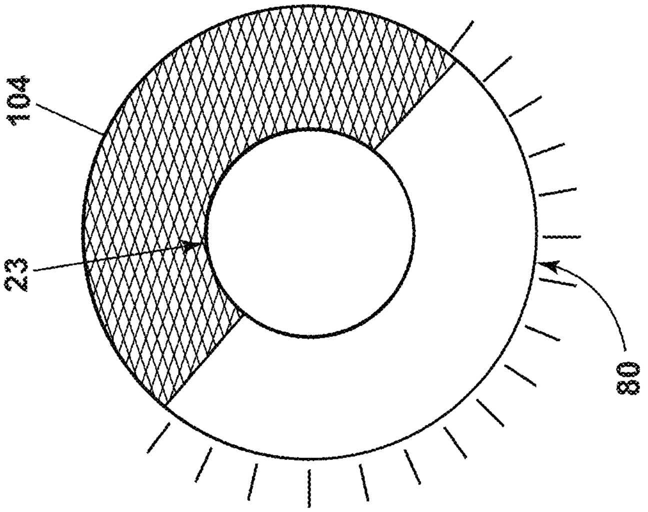
Figure 9A:
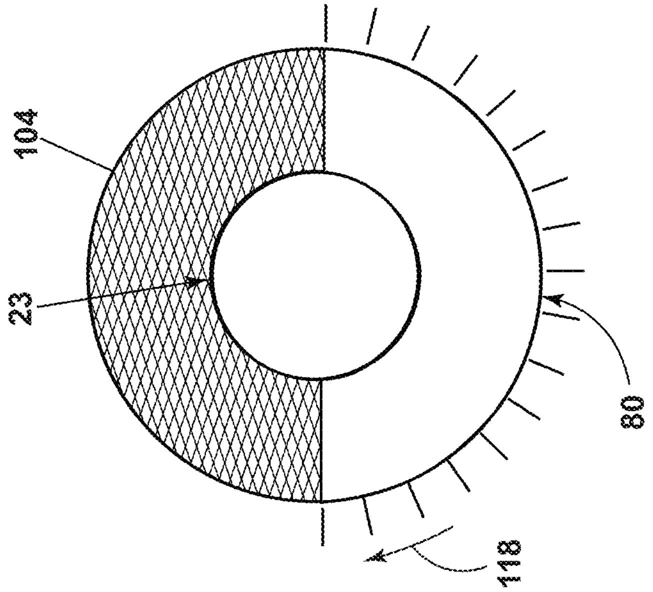
Figure 9D:
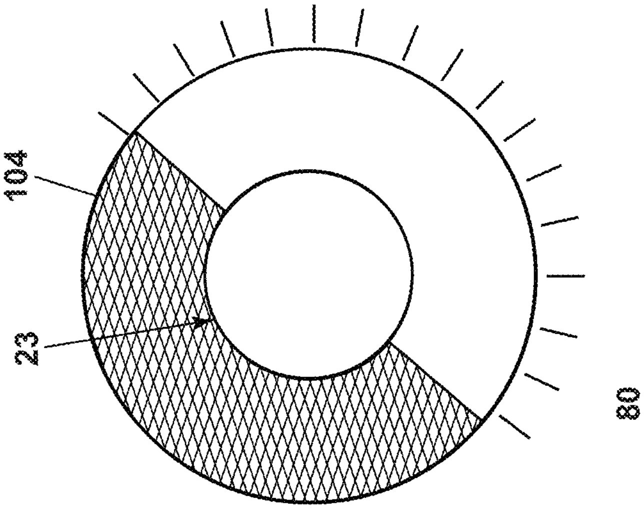
Figure 9E:
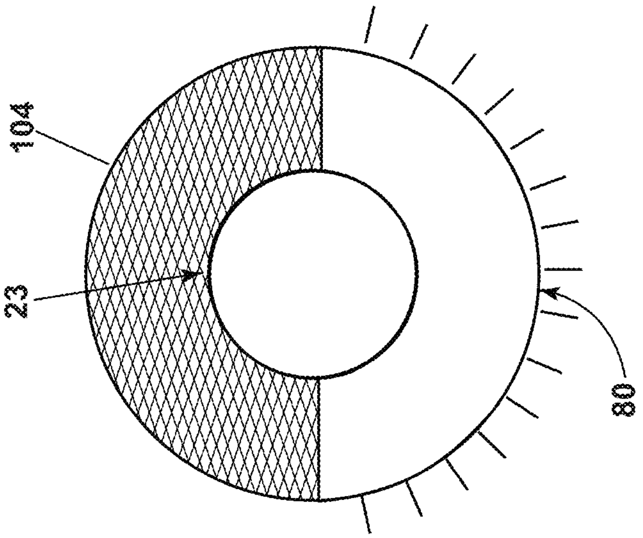

FIGS. 9A-E illustrate the semi-circle rocker illumination pattern. FIG. 9A illustrates the semi-circle rocker illumination pattern beginning with the bottom half of the light emitting portion 104 lit, appearing as a U-shape light. The illumination increases in the clockwise direction at the same time the unlit portion increases in the clockwise direction, indicated by an arrow 118. This gives the lit U-shape the appearance of gradually rocking to the left until reaching a predetermined position, as illustrated in FIG. 9B. FIG. 9C illustrates the U-shape once it has gradually returned to the original position, from FIG. 9B to FIG. 9C, the lit U-shape appears to rock in a counterclockwise direction indicated by another arrow 120. The U-shape appears to continue rocking in the counterclockwise direction until reaching a predetermined position as indicated by FIG. 9D. Once reaching the predetermined position, the U-shape returns to the beginning position as illustrated in FIG. 9E. From 9E the pattern can repeat by going from 9E to 9B. Repeating this pattern generates an illuminated U-shape that appears to shift or rock to the left and right about a bottom or beginning location.

Figure 10A:
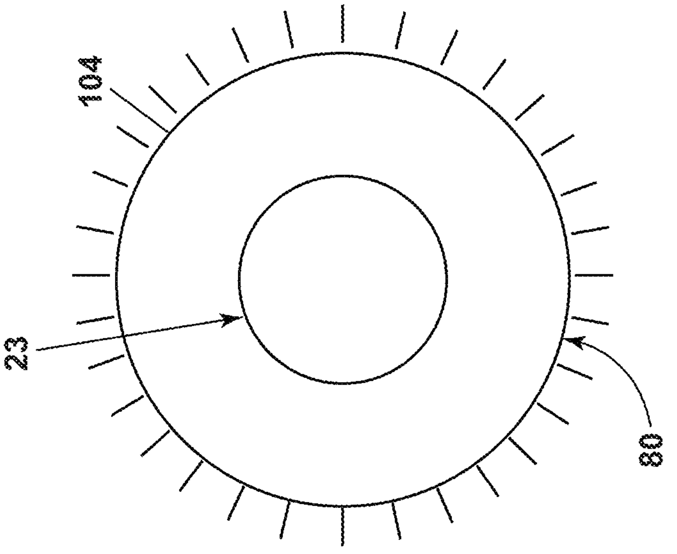
FIGS. 10A-C are a schematic illustration of an upward sweep illumination pattern of the household appliance of FIG. 2.
Figure 10B:
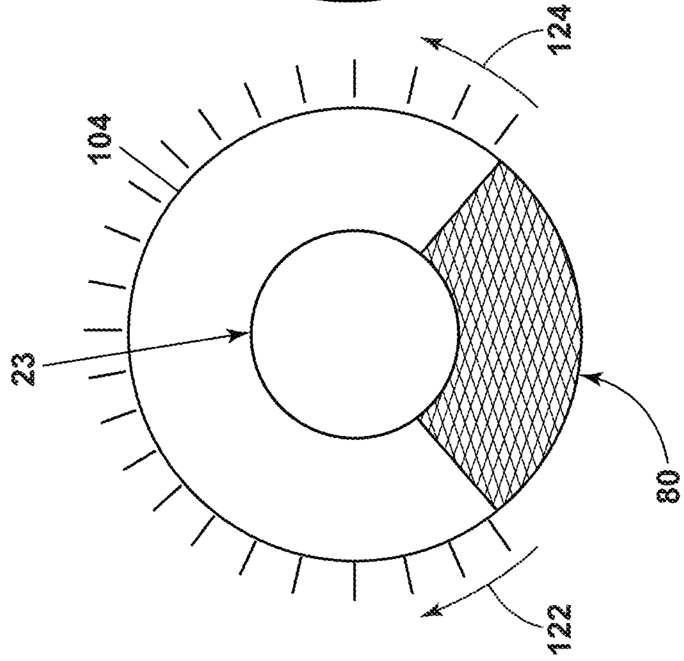
Figure 10C:
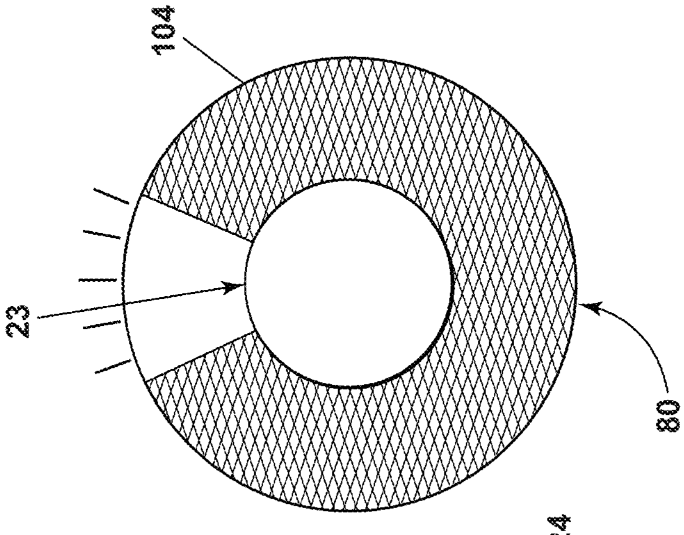

FIGS. 10A-C illustrate the upward sweep illumination pattern. In FIG. 10A, the upward sweep begins with the entire light emitting portion 104 lit. FIG. 10B illustrates a small unlit portion that appears at the bottom of the light emitting portion 104 and expands in the clockwise and counter clockwise direction, indicated by arrows 122, 124. The unlit portion expands until just a small top part of the light emitting portion 104, as shown in FIG. 10C. The flow of light from 10A to 10C giving the appearance of the light being swept upward. The lit top part can indicate directionality, that is, that the pattern relates to something above the luminary communication interface 80. The pattern abruptly repeats, going from just the top part of the light emitting portion 104 being lit to the beginning appearance of the entire light emitting portion 104 being lit.

Figure 11A:
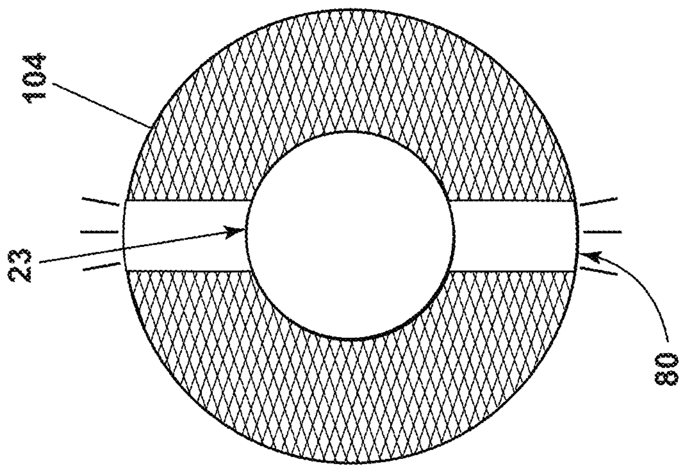
FIGS. 11A-E are a schematic illustration of a split ring illumination pattern of the household appliance of FIG. 2.
Figure 11B:
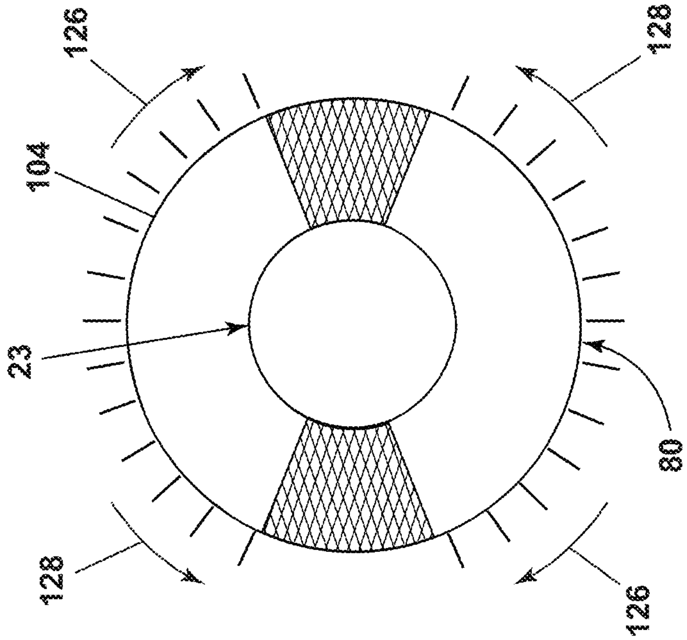
Figure 11C:
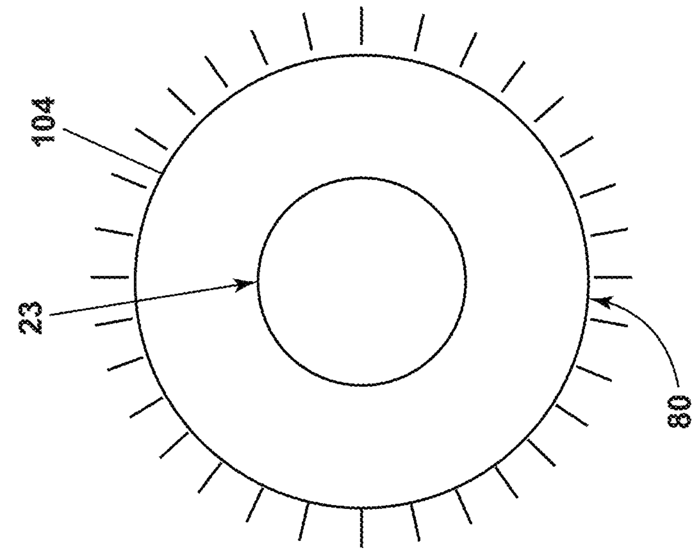
Figure 11E:
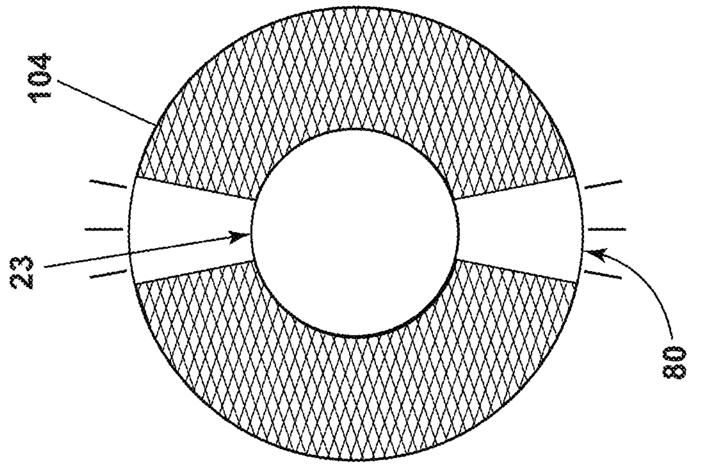
Figure 11D:
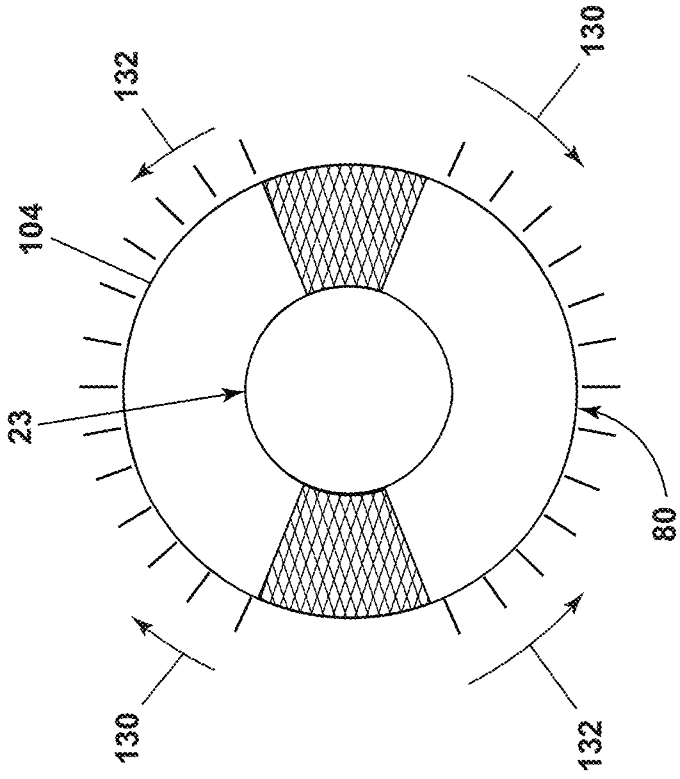

FIGS. 11A-E illustrate the split ring illumination pattern. The split ring begins with the two lit portions that appear; one on the top and one on the bottom. The lit portions gradually increase in area at a uniform rate in both the clockwise and counterclockwise directions as illustrated by arrows 126, 128 as illustrated in FIG. 11B. The lit portions continue to increase until the entire light emitting portion 104 is lit as illustrated in 11C. Then, as illustrated in FIG. 11D two unlit portion appear; on the left and one on the right. The unlit portions gradually increase in area at a uniform rate in both the clockwise and counterclockwise directions as illustrated by arrows 130, 132 as illustrated in FIG. 11D until only a small portion of the top and bottom of the light emitting portion 104 are lit as illustrated in FIG. 11E.

Alternatively, the two lit portions can be the right and left portions instead of the top and bottom portions. The lit area on the left and right can grow in a clockwise and counterclockwise direction until the entire light emitting portion 104 is lit. Unlit portions can appear on the top and bottom that similarly increase in area until the entire light emitting portion 104 is unlit.

In operation, one or more articles can be placed in the treating chamber 20 of the household appliance 10. The user can communicate with the controller 76 via the user interface 78 to, for example, select a cycle of operation. The cycle of operation requires at least one consumable 23, illustrated herein, as the filter cartridge 64 or the softener cartridge 66.

At the beginning of the cycle of operation, during the cycle of operation, or after the cycle of operation, the luminary communication interface 80, separate from the user interface 78, supplies information to the user related to the status of the filter cartridge 64 or the softener cartridge 66. The status can generally relate to, by way of non-limiting example, indicating an unused consumable, the portion of a consumable used, or a need to replace the consumable.

Combination(s) of colored light motion and light intensity patterns uniquely illustrate the status of the filter cartridge 64 or the softener cartridge 66. The light emitting portion 104 of the luminary communication interface 80 circumscribes the filter cartridge 64. Different colored lights or patterns indicate whether the status reported by the luminary communication interface 80 relates to the filter cartridge 64 or the softener cartridge 66.

The luminary communication interface 80 can be easier to see at a distance than the user interface 78. The first door 92 overlies the luminary communication interface 80 and filter cartridge 64. The first door 92 is, for example, semi-transparent, allowing the user to see the light emitting portion 104 of the luminary communication interface 80. Optionally, the first door 92 can diffuse or soften the light from the light emitting portion 104.

By way of non-limiting example, the light emitting portion 104 displays the upward sweep pattern in green. The user can understand from the directional indicia of the pattern that the softener cartridge 66 above the luminary communication interface 80 requires replacement. Alternatively, a yellow ring pulse can indicate that the filter cartridge 64, is close to needing replacement.

Additionally, or alternatively, the luminary communication interface 80 can use combination(s) of colored light motion and light intensity patterns uniquely illustrate the status of the cycle of operation. For example, a blue semicircle rocker can illustrate that the water recirculation portion of the cycle of operation is activated.

Additionally, or alternatively, the light emitting portion 104 can also be activated while the household appliance 10 is not performing a cycle of operation. The luminary communication interface 80 can be in communication with at least a motion sensor. When the motion sensor detects motion, the light emitting portion 104 can be lit. It is contemplated that the intensity or brightness of the light emitting portion 104 can be controlled by light sensors detecting the current light level for the environment in which the household appliance 10 is located.

Benefits of the present disclosure include the ease of communication between the household appliance and the user as to the status of the consumable. That is, the user does not have to cycle through a menu or approach the user interface, rather the luminary communication interface can be easier to see than the user interface.

Another benefit is that ability to trigger the luminary communication interface with a motion sensor. This will provide an appropriate level of light to a room before or after a cycle of operation.

Yet another benefit is the ability for the user to obtain cycle information from the luminary communication interface. That is, the luminary communication interface can indicate to the user what portion of the cycle is running this allows the user to quickly observe whether the appliance is still operating or on. Further, the luminary communication interface can also indicate if an appliance is in a cool down portion of the cycle of operation.

To the extent not already described, the different features and structures of the various aspects can be used in combination with each other as desired. That one feature may not be illustrated in all of the aspects of the disclosure is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While the aspects of the present disclosure have been specifically described in connection with certain specific details thereof, it is to be understood that this is by way of illustration and not of limitation. Reasonable variation and modification are possible within the scope of the forgoing disclosure and drawings without departing from the spirit of the present disclosure, which is defined in the appended claims. Hence, specific dimensions and other physical characteristics relating to the aspects of the present disclosure are not to be considered as limiting, unless expressly stated otherwise.

What is claimed is:

1. A method of providing a status of at least one consumable in a household appliance comprising a cabinet defining a treating chamber, a dock positioned in the cabinet, a controller programmed with a cycle of operation, and a user interface carried by the cabinet and physically spaced apart from the dock and coupled to the controller for providing data communication between the controller and user, the method comprising:

emitting at least one of a colored light pattern, a light motion pattern, or a light intensity pattern from a luminary communication interface to illustrate the status of the at least one consumable, and wherein a door overlies at least a portion of the dock and the luminary communication interface, or the luminary communication interface circumscribes at least a portion of the dock, or the luminary communication interface circumscribes the at least one consumable, or a second port is located in the cabinet and spaced from the dock and spaced from the user interface.

2. The method of claim 1, wherein the at least one consumable includes a treating chemistry, a water softener, or water filter.

3. The method of claim 1, wherein the at least one consumable comprises multiple consumables and a unique combination of at least one of a colored light pattern, a light motion pattern, or a light intensity pattern is emitted for each of the multiple consumables.

4. The method of claim 3, wherein a first of the multiple consumables is a filter cartridge and a second of the multiple consumables is a softener cartridge.

5. The method of claim 3, wherein a first color is utilized to provide a status of a first of the multiple consumables and a second color is utilized to provide a status of a second of the multiple consumables.

6. The method of claim 1, wherein the door is transparent or semi-transparent.

7. The method of claim 1, wherein the emitting further illustrates a status of a cycle of operation.

8. The method of claim 1, wherein the second port comprises a second internal dock for receiving a second consumable.

9. The method of claim 8, wherein the second internal dock comprises a drawer.

10. The method of claim 1 wherein the emitting is in an annulus.

11. The method of claim 1, wherein the cabinet further comprises a pedestal for supporting a portion of the cabinet and wherein the dock is positioned in the pedestal.

12. The method of claim 11, wherein the dock is positioned in a port in the pedestal.

13. The method of claim 12, wherein the port is annular.

14. The method of claim 1, wherein the at least one consumable comprises multiple consumables wherein the luminary communication interface is physically associated with only one of the multiple consumables while the at least one of a colored light pattern, a light motion pattern, or a light intensity pattern provides directional indicia for at least one of the other multiple consumables.

15. The method of claim 1 wherein the emitting comprises at least two of the group of: the colored light pattern, the light motion pattern, and the light intensity pattern.

16. The method of claim 1, further comprising determining motion, via a sensor, and activating the emitting based thereon.

17. The method of claim 1, further comprising detecting ambient light, via a sensor, and adjusting the emitting based thereon.

* * * * *